United States Patent [19]

Brassaw

[11] 4,168,501
[45] Sep. 18, 1979

[54] METHOD AND SYSTEM FOR MOVING TARGET ELIMINATION AND INDICATION

[75] Inventor: Lloyd L. Brassaw, Canoga Park, Calif.

[73] Assignee: The United States of America as represented by the Secretary of the Air Force, Washington, D.C.

[21] Appl. No.: 233,835

[22] Filed: Mar. 10, 1972

[51] Int. Cl.² .......................... G01S 9/22; G01S 9/42
[52] U.S. Cl. .............................. 343/7.7; 343/5 CM; 343/7 A; 343/16 M
[58] Field of Search ................. 343/7.7, 16 M, 5 CM, 343/7 A

[56] References Cited

U.S. PATENT DOCUMENTS

| | | | |
|---|---|---|---|
| 3,308,457 | 3/1967 | Winn | 343/16 M X |
| 3,378,843 | 4/1968 | Sherman | 343/16 M |
| 3,480,953 | 11/1969 | Shreve | 343/7.7 |
| 3,706,989 | 12/1972 | Taylor, Jr. | 343/7 A |

Primary Examiner—Malcolm F. Hubler
Attorney, Agent, or Firm—Joseph E. Rusz; Julian L. Siegel

[57] ABSTRACT

In-phase sum and difference signals and quadrature sum and difference signals from a monopulse radar system are processed to form the sum of the in-phase signals, the sum of the quadrature signals, the difference of the in-phase signals, and the difference of the quadrature signals. The processed sum signals and the processed difference signals are then combined to form complex signals one of which is advanced and the other retarded by predetermined time. The complex signals are then divided into sequences of frequencies by identical banks of narrow band filters. The differences between the outputs of corresponding filters from each bank are averaged and then divided by a constant to form a beam pointing error value.

4 Claims, 3 Drawing Figures

METHOD AND SYSTEM FOR MOVING TARGET ELIMINATION AND INDICATION

BACKGROUND OF THE INVENTION

This invention relates to radar for air launched missile systems, and more particularly to a null command generator moving target eliminator and indicator.

The present invention is a novel system for processing radar reflection from a monopulse antenna system and converting these signals into beam pointing error signals which can be used to alter the position of the antenna and thereby track a target. The process also acts as a moving target indicator.

The invention performs two primary functions, in that it reduces the effects of moving targets on a null command generator, and it indicates the presence of moving targets. It is in effect a novel null command generator that incorporates some of the principles of what is referred to as an advanced null command generator.

SUMMARY OF THE INVENTION

The invention presented here processes input signals derived from a monopulse radar system, these signals including in-phase and quadrature sum signals and in-phase and quadrature difference signals. Preprocessing converts these signals into complex signals A and B where $A = A_{in} + jA_{qd}$ and $B = B_{in} + jB_{qd}$ and A and B are then delayed and advanced respectively. Each is fed through identical banks of narrow band filters and the phase difference of corresponding filters of each bank are averaged.

It is an object of the invention to provide a novel and improved radar processor.

It is another object to provide a null command generator system for processing radar reflections from a monopulse radar for an air launched missile.

It is another object to provide a monopulse radar system that reduces the effect of moving targets on a null command generator and also indicates their presence.

These and other advantages, features and objects of the invention will become more apparent from the following description taken in connection with the illustrative embodiment in the accompanying drawings.

DETAILED DESCRIPTION OF THE PREFERRED EMBODIMENT

Figure 1:
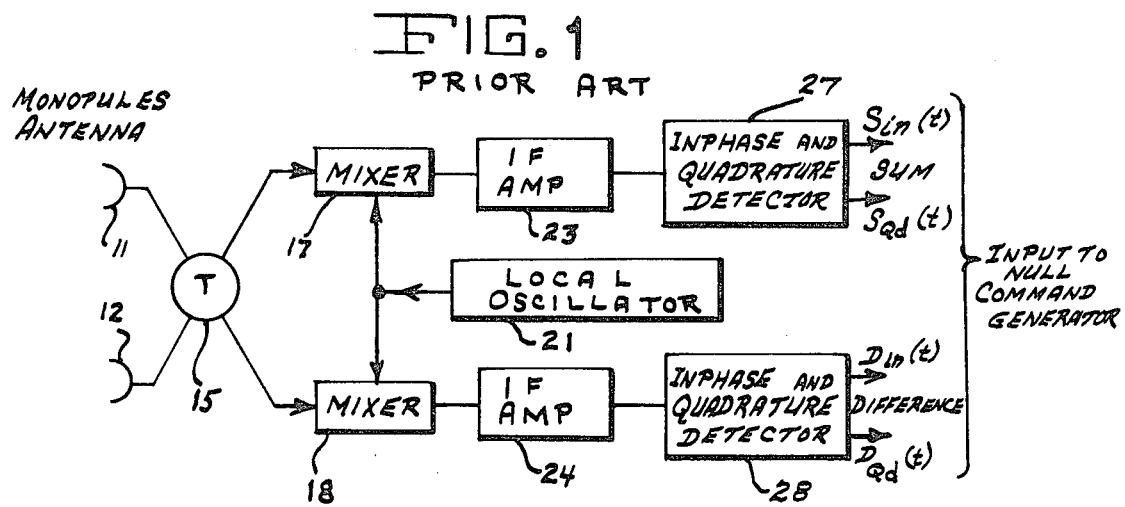
FIG. 1 is a block diagram showing the conventional input to a null command generator.

The input to the improved null command generator is the same as that used in the past and is shown in FIG. 1. The radar signals are received in monopulse antennas 11 and 12 and are fed to magic tee circuit 15 which forms a sum and difference that are fed respectively to mixers 17 and 18 which are also fed by local oscillator 21 which serves as synthetic target signals. Mixers 17 and 18 are then fed to intermediate frequency amplifiers 23 and 24 respectively which are then fed to in-phase and quadrature detectors 27 and 28. Detector 27 produces in-phase and quadrature sum signals while detector 28 produces in-phase and quadrature difference signals. The sum and difference of the in-phase signals are formed respectively in adder 31 and subtractor 32 while the sum and difference of the quadrature signals are formed respectively in adder 35 and subtractor 36. The sums of the outputs of subtracting circuits 33 and 36 and adder circuits 33 and 35 are then respectively formed in adders 39 and 40 and produce signals A and B which are advanced and retarded in circuits 43 and 44 by $\tau_d$ which is equal to the difference between the antenna phase centers divided by the product of four times the velocity of the aircraft and the sine of the target azimuths. The outputs of circuits 43 and 44 produce signals $A_d$ and $B_a$.

Figure 2:
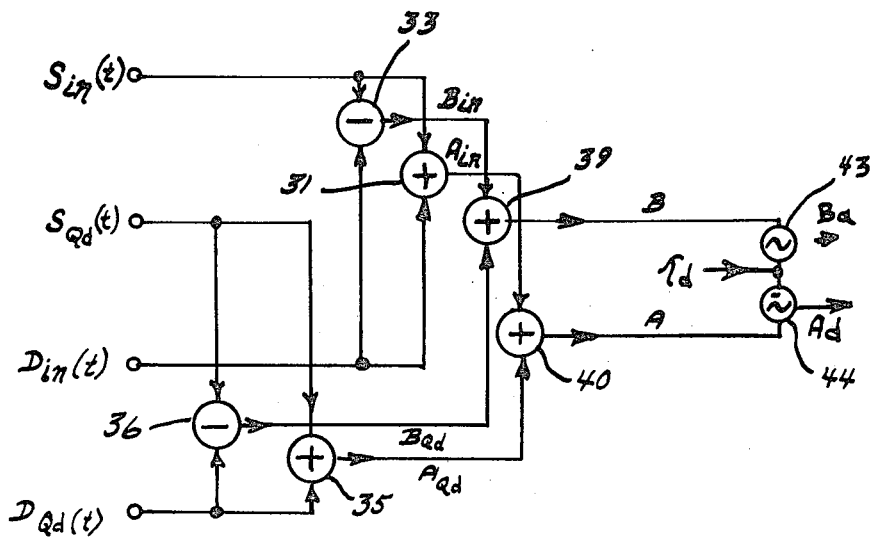
FIG. 2 is a block diagram showing the preprocessor for the null command generator.
Figure 3:
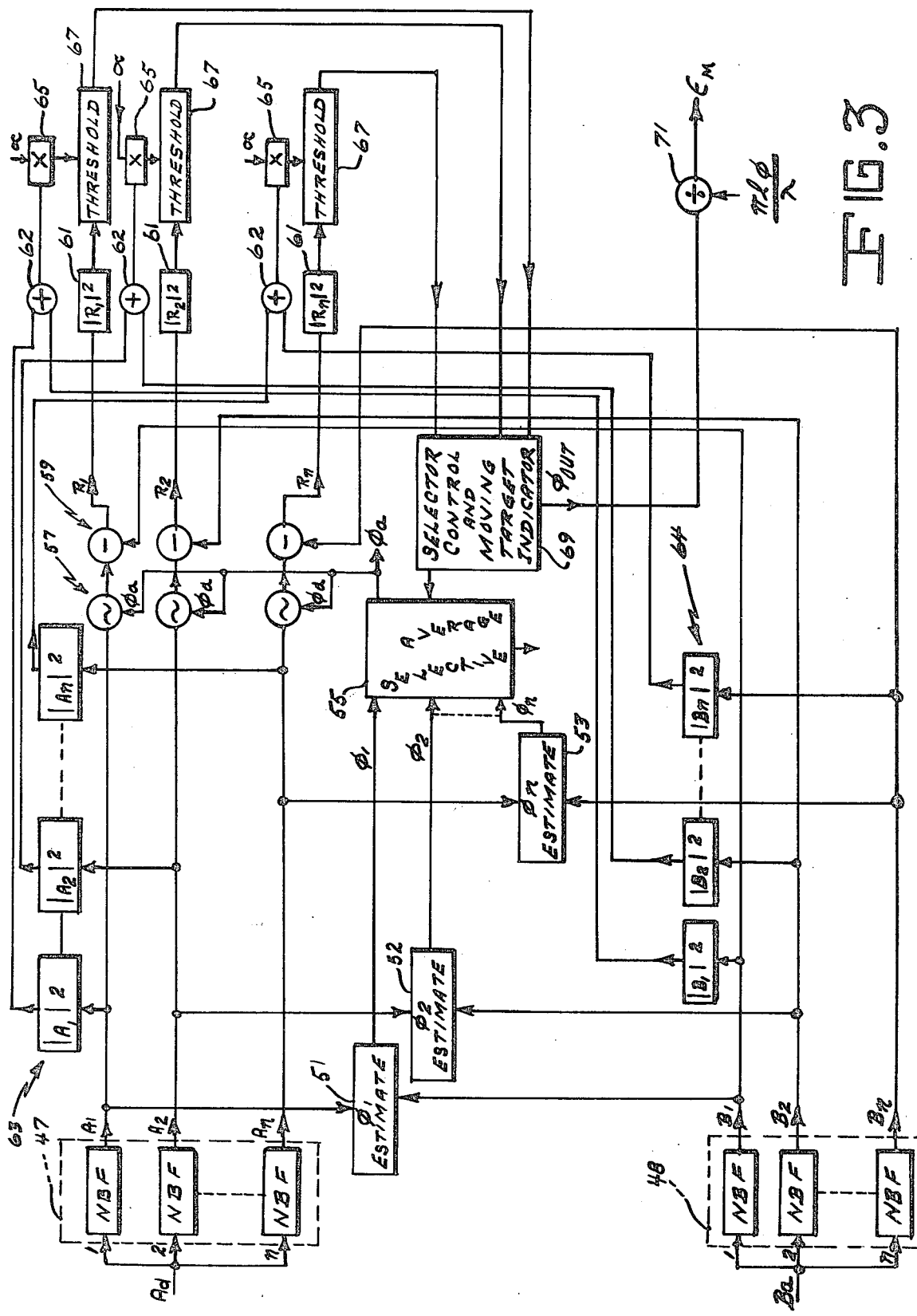
FIG. 3 is a block diagram showing the null command generator.

As shown in FIG. 2, the processor now passes the $A_d$ and $B_a$ signals through identical narrow band filter banks 47 and 48 having n filters. The narrow band filter outputs are processed in various ways. First, the phase difference between the narrow band filter $A_1$ and the narrow band filter $B_1$ is formed in circuit 51. This is proportional to the antenna beam pointing error; that is, the angle between the monopulse null plane and the synthetic target. The phase angles between the other $A_i$ and $B_i$ complex quantities are similarly computed in circuits 52 to 53.

The first average of the previously computed phase angles $\phi_i$ is computed in the selective averaging circuit 55. This average is not $\phi_a$. Before $\phi_a$ is computed the absolute value of the difference between each $\phi_i$ and this first average is compared with a constant. A second $\phi$ average is now computed using only those $\phi_i$ whose absolute difference from the first mean did not exceed the constant. This second average then is denoted $\phi_a$.

The $A_i$ outputs of the $A_d$ channel narrow band filter bank are now advanced in phase by an amount $\phi_a$ in phase advance circuits 57. Next, the difference of these signals and their correspondents that are not phase rotated in the $B_i$ channels is formed in circuits 59, and then the absolute value squared denoted as $|R_i|^2$ of each of these differences is formed in circuits 61. They are greater when moving target signals are present in the corresponding narrow band filters.

In order to compute a reference for each of the above, the absolute values squared of the output of each narrow band filter are formed in circuits 63 and 64. Corresponding absolute squared values of the A and B channels are added in adder 62 and multiplied by $\alpha$, a fixed constant, in multiplier 65 forming a reference value or theshold.

The previously computed $|R_i|^2$ quantities are now compared with their references in threshold circuit 67 by subtraction thereby performing the relation $$\{|R_i|^2 - \alpha|A_i|^2 + |B_i|^2\}.$$

If the fixed positive quantity is exceeded by any channels, then the $\phi_i$ of those channels are not used in computing the final phase, $\phi_{out}$.

The final phase estimate is accomplished by taking an average of the $\phi_i$ from those channels whose $R_i^2$ were sufficiently small, and consequently did not have a threshold crossing as just described. This is again carried out in the selective averaging circuit with selector control 69 controlling which $\phi_i$'s are to be added.

To obtain the estimate of the beam pointing error the $\phi_{out}$ quantity is divided by the constant $(\pi l_\phi/\lambda)$ in divisor 71 where $l_\phi$ is the distance between antenna phase centers. The result is an estimate of the beam pointing error.

Many modifications of the above null command generator processor are possible. For example, the $\phi_i$ estimates selected for rejection need not be determined each time new $A_i$ and $B_i$ are determined. Past rejection information can be used and periodically updated. The beam pointing estimates can be smoothed, or the $\phi_{out}$ estimates can be smoothed before the division process. Also, the threshold circuits and the related computations can be omitted. In this case $\phi_a$ is taken as $\phi_{out}$. This concept, as presented in this invention, is also applicable to synthetic array and doppler beam sharpening systems to indicate moving targets.

What is claimed is:

1. In a monopulse radar system, a null command generator fed by the in-phase and quadrature sum and difference signals derived from target reflections received at monopulse antennas comprising:
    a. a first subtracting circuit fed by the in-phase sum and difference signals;
    b. a second subtracting circuit fed by the quadrature sum and difference signals;
    c. a first summing circuit fed by the in-phase sum and difference signals;
    d. a second summing circuit fed by the quadrature sum and difference signals;
    e. a third summing circuit fed by the first and second subtracting circuits;
    f. a fourth summing circuit fed by the first and second summing circuits;
    g. means for delaying the output of the third summing circuit by a time value $\tau_d$, where $\tau_d$ is a value equal to the distance between the antenna phase center divided by the product of 4 times the product of the aircraft velocity and the target azimuth;
    h. means for advancing the output of the fourth summing circuit by $\tau_d$;
    i. a first bank of narrow band filters fed by the delaying means;
    j. a second bank of narrow band filters identical to that of the first bank fed by the advancing means;
    k. means for phase differencing corresponding filters of the first and second banks of narrow band filters; and
    l. means for averaging the outputs of the phase differencing means.

2. A null command generator according to claim 1 which further comprises:
    a. a bank of means for advancing the phase of the output for a first bank of narrow band filters;
    b. a bank of subtracting circuits fed by corresponding outputs of the advancing means bank and the second bank of narrow band filters;
    c. a first bank of means for obtaining the square of the absolute value of the outputs of the bank of subtracting circuits;
    d. a second bank of means for obtaining the square of the absolute value of the outputs of the first bank of narrow band filters;
    e. a third bank of means for obtaining the square of the absolute value of the outputs of the second bank of filters;
    f. means for adding the outputs of corresponding absolute value squaring means of the second and third banks thereof;
    g. a bank of means for multiplying a constant to the output of the bank of adding means forming a threshold signal;
    h. means for comparing the threshold signals with the corresponding output of the first bank of absolute squaring means for selection control, the output of the comparing means being fed to the averaging means; and
    i. means for dividing the output of the averaging means by a value equal to the product of $\pi$ times the distance between the phase centers of the antennas divided by the wavelength of the radar signal.

3. A method of generating an error signal from in-phase and quadrature sum signals and in-phase and quadrature difference signals derived from a monopulse radar system comprising:
    a. subtracting the in-phase signals forming a first difference;
    b. adding the in-phase signals forming a first sum;
    c. subtracting the quadrature signals forming a second difference;
    d. adding the quadrature signals forming a second sum;
    e. adding the first and second sums forming a first complex signal;
    f. adding the first and second differences forming a second complex signal;
    g. advancing the first complex signal by a predetermined value;
    h. delaying the second complex signal by said predetermined value;
    i. narrow band filtering the delayed complex signal into a first sequence of frequency bands;
    j. narrow band filtering the advanced complex signal into a second sequence of frequency bands corresponding to the first sequence;
    k. phase differencing the signals from corresponding frequency bands of the first and second sequences forming a sequence of phase difference signals; and
    l. averaging the phase difference signals.

4. A method of generating an error signal according to claim 3 which further includes:
    a. advancing the phase of the first sequence by a value equal to the phase difference average;
    b. subtracting the second sequence from the advanced first sequence forming a sequence of phase rotated signals;
    c. squaring the absolute value of the sequence of phase rotated signals;
    d. squaring the absolute value of the first sequence of the frequency band;
    e. squaring the absolute value of the second sequence of the frequency band;
    f. adding the corresponding absolute value squared of the first and second sequences to form a sequence of absolute squared sums;
    g. mutiplying each of the absolute squared sums by a constant to form a sequence of thresholds;
    h. subtracting the sequence of thresholds from the sequence of phase rotated signals; and
    i. averaging the sequence of threshold signal differences that exceed a predetermined value.

* * * * *